United States Patent
Xiang et al.

(10) Patent No.: US 9,563,278 B2
(45) Date of Patent: Feb. 7, 2017

(54) GESTURE CONTROLLED AUDIO USER INTERFACE

(71) Applicant: QUALCOMM Incorporated, San Diego, CA (US)

(72) Inventors: Pei Xiang, San Diego, CA (US); Hui-ya Liao Nelson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 13/664,281

(22) Filed: Oct. 30, 2012

(65) Prior Publication Data

US 2013/0154930 A1 Jun. 20, 2013

Related U.S. Application Data

(60) Provisional application No. 61/577,489, filed on Dec. 19, 2011.

(51) Int. Cl.

| | |
|---|---|
| *G06F 3/033* | (2013.01) |
| *G06F 3/01* | (2006.01) |
| *G06F 3/16* | (2006.01) |
| *G06F 1/16* | (2006.01) |
| *G06F 3/0481* | (2013.01) |
| *G06F 3/0488* | (2013.01) |
| *G06F 3/0346* | (2013.01) |
| *G06F 3/0354* | (2013.01) |

(52) U.S. Cl.
CPC .............. *G06F 3/017* (2013.01); *G06F 1/1684* (2013.01); *G06F 3/0346* (2013.01); *G06F 3/03547* (2013.01); *G06F 3/04815* (2013.01); *G06F 3/04883* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 7,190,794 B2 | 3/2007 | Hinde | |
| 7,596,765 B2 | 9/2009 | Almas | |
| 7,953,236 B2 | 5/2011 | Vronay | |
| 8,210,942 B2* | 7/2012 | Shimabukuro | G07F 17/3209 200/314 |
| 8,421,642 B1* | 4/2013 | McIntosh et al. | 340/686.1 |

(Continued)

FOREIGN PATENT DOCUMENTS

| | | |
|---|---|---|
| CN | 1149157 A | 5/1997 |
| JP | H0990963 A | 4/1997 |

(Continued)

*Primary Examiner* — Amr Awad
*Assistant Examiner* — Donna Lui
(74) *Attorney, Agent, or Firm* — Austin Rapp & Hardman

(57) ABSTRACT

A user interface, methods and article of manufacture each for selecting an audio cue presented in three-dimensional (3D) space are disclosed. The audio cues are audibly perceivable in a space about a user, where each of the audio cues may be perceived by the user as a directional sound at a distinct location from other audio cues in the space. Selection of a specific audio cue is made based on one or more user gestures. A portable electronic device may be configured to present the audio cues perceived by a user and detect certain user gestures to select audio cues. The audio cue selection can be used to control operation of the portable device and/or other associated devices.

31 Claims, 13 Drawing Sheets

(56) References Cited

U.S. PATENT DOCUMENTS

| | | | |
|---|---|---|---|
| 8,935,438 B1* | 1/2015 | Ivanchenko | G06F 1/1632 |
| | | | 361/679.31 |
| 2002/0175933 A1 | 11/2002 | Ronkainen et al. | |
| 2003/0097190 A1 | 5/2003 | Watanabe et al. | |
| 2006/0136544 A1* | 6/2006 | Atsmon et al. | 709/200 |
| 2009/0088204 A1* | 4/2009 | Culbert | G06F 3/017 |
| | | | 455/556.1 |
| 2009/0166098 A1 | 7/2009 | Sunder | |
| 2009/0179857 A1 | 7/2009 | Hsu et al. | |
| 2009/0229892 A1* | 9/2009 | Fisher et al. | 178/18.03 |
| 2011/0010627 A1* | 1/2011 | Donaldson et al. | 715/727 |
| 2011/0153044 A1 | 6/2011 | Lindahl et al. | |
| 2011/0187725 A1 | 8/2011 | Matsuda | |
| 2013/0041648 A1* | 2/2013 | Osman | H04S 7/302 |
| | | | 704/2 |

FOREIGN PATENT DOCUMENTS

| | | | |
|---|---|---|---|
| JP | 2000194460 A | 7/2000 | |
| JP | 2005039461 A | 2/2005 | |
| JP | 2006287878 A | 10/2006 | |
| JP | 2009525538 A | 7/2009 | |
| JP | 2010102585 A | 5/2010 | |
| JP | 2010152570 A | 7/2010 | |
| JP | 2011164666 A | 8/2011 | |
| JP | 2011211312 A | 10/2011 | |
| WO | 2007089766 A2 | 8/2007 | |
| WO | 2007134644 | 11/2007 | |

\* cited by examiner

GESTURE CONTROLLED AUDIO USER INTERFACE

CLAIM OF PRIORITY UNDER 35 U.S.C. §119

The present Application for Patent claims priority to U.S. Provisional Application No. 61/577,489 entitled "Multi-Sensor Controlled 3-D Audio Interface," filed Dec. 19, 2011, assigned to the assignee hereof and hereby expressly incorporated by reference herein.

BACKGROUND

Field

The present disclosure generally relates to human-machine interfaces, and more specifically, to gesture-based interfaces.

Background

Smart devices, such as smart cellular phone, often provide sophisticated user interfaces. Many of these interface designs are focused on touch screens and visual feedback. Smart devices with multi-touch screens like the iPhone and iPad are widely used and popular today. The touch screen provides a very versatile interface where software buttons, sliders and many other inputs can be manipulated by the user to control the device. However, in some situations, such a detailed visual interface may not be ideal. For example, when driving a car, safety is very important that the user's eyes should remain on the road, not on the device. Another example is jogging while listening to music on a portable device. In this situation, a user may not want to be required to look at a display screen in order to make song selections or adjust volume.

SUMMARY

This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An improved user interface for electronic devices is disclosed. The user interface permits a gesture-based user selection of audio cues presented to a user. The audio cues are audibly perceivable in a space about the user, where each of the audio cues may be perceived by the user as a directional sound at a distinct location from other audio cues in the space. Selection of a specific audio cue is made based on one or more user movements made relative to the electronic device. The audio cue selection can be used to control operation of the electronic device and/or other associated devices.

In accordance with an aspect of the interfacing techniques disclosed herein, a portable electronic device may be configured to present the audio cues perceived by a user and detect certain user gestures to select audio cues.

In accordance with another aspect, an apparatus includes a circuit, a user interface and a selector. The circuit is configured to generate audio cues that are audibly perceivable in a space about a user. Each audio cue is generated so as to be perceived by the user as a directional sound at a distinct location from other audio cues in the space. The user interface is configured to detect user movement relative to the apparatus, made in response to the audio cues, and the selector is configured to select at least one of the audio cues based on the user movement.

According to a further aspect, an apparatus includes means for generating audio cues that are audibly perceivable in a space about a user. Each audio cue is generated so as to be perceived by the user as a directional sound at a distinct location from other audio cues in the space. The apparatus also includes means for detecting user movement relative to the apparatus, made in response to the audio cues, and means for selecting at least one of the audio cues based on the user movement.

According to a further aspect, a computer-readable medium embodying a set of instructions executable by one or more processors stores code for generating audio cues that are audibly perceivable in a space about a user. Each of the audio cues is generated so as to be perceived by the user as a directional sound at a distinct location from other audio cues in the space. The medium also stores code for detecting user movement relative to a portable device, made in response to the audio cues, and code for selecting at least one of the audio cues based on the user movement.

According to a further aspect, a method of providing a user interface at an electronic device includes generating, by the electronic device, audio cues that are audibly perceivable in a space about a user. Each audio cue is generated so as to be perceived by the user as a directional sound at a distinct location from other audio cues in the space. The method also includes detecting user movement relative to the electronic device, made in response to the audio cues, and selecting at least one of the audio cues based on the user movement.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the techniques and devices described herein. In the figures, like reference numerals designate corresponding parts throughout the different views.

DETAILED DESCRIPTION

The following detailed description, which references to and incorporates the drawings, describes and illustrates one or more specific configurations. These configurations, offered not to limit but only to exemplify and teach, are shown and described in sufficient detail to enable those skilled in the art to practice what is disclosed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Generally, this disclosure describes electronic devices, including handheld devices that have a spatial audio user interface as an alternative or in addition to any visual user interfaces. With spatial audio, the device produces audio cues that are perceived by the user at specific locations in a physical space surrounding him/her. The audio cues can be presented and located at different points in two-dimensional (2D) space or three-dimensional (3D) space. It should be understood from a person having ordinary skill in the art, that the 2D or 3D spaces are in a physical space. The audio cues can represent valuable information to the user, such as the location of music files on the device, or the like. Disclosed herein are ways in which the user can select a particular spatial audio cue by gesturing, e.g., swiping a touch screen or pointing in the direction of the cue, to select the cue. A device equipped to detect such gestures may include different types of sensors, permitting the user to navigate and control information and the device by hearing and selecting spatial audio cues.

Spatial audio can offer an alternative environment to visually-displayed user interface (UI) information, and may audibly present information such as hierarchical menus, indices of a collection of media content, virtual maps for navigation and the like. A spatial audio UI can use spatial audio as an alternative presentation environment, and utilize different types of sensors to navigate and provide control inputs in such an environment.

Figure 1:
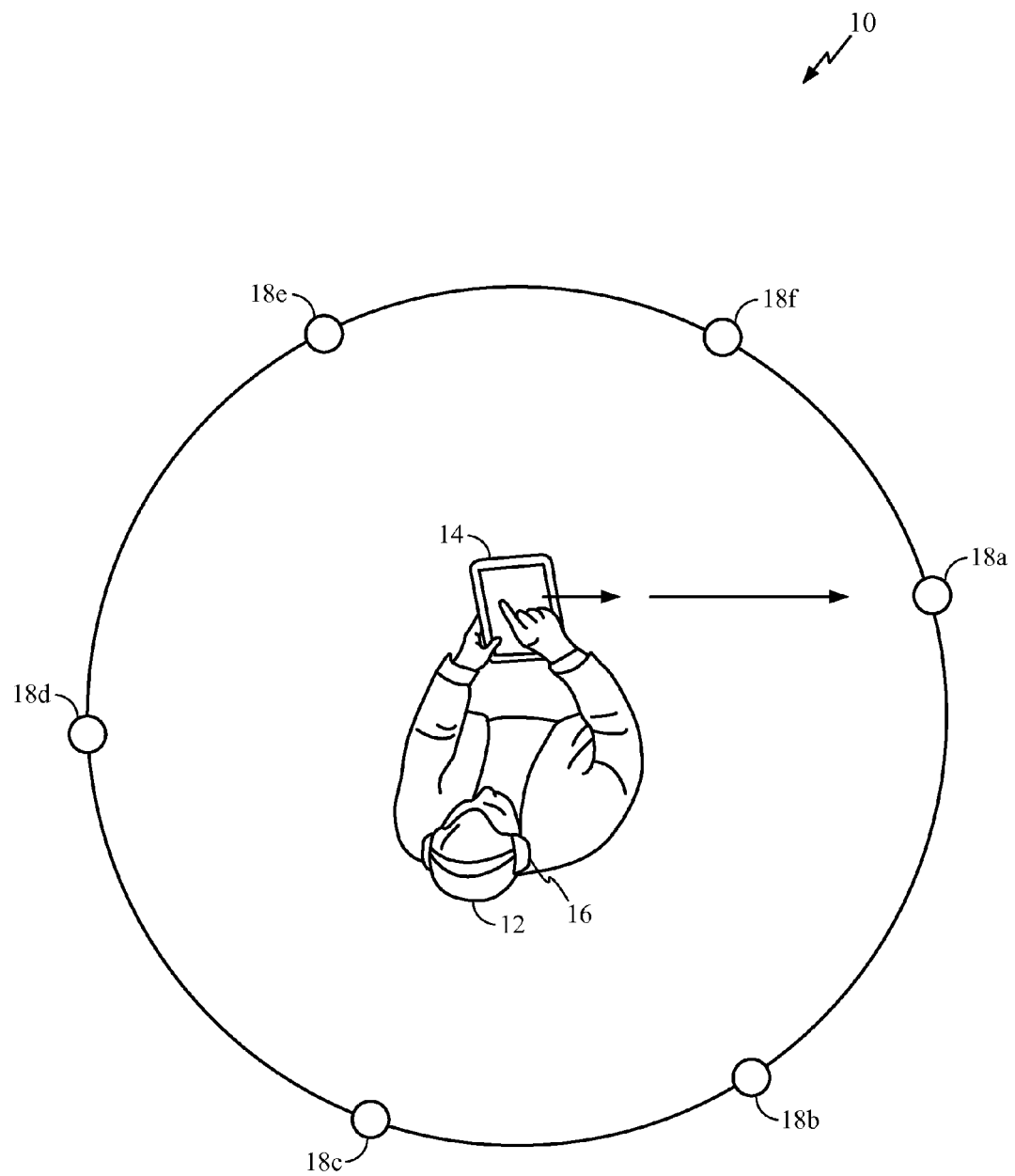
FIG. 1 is a top-down perspective diagram illustrating a set of auditory cues presented spatially around a user, with the user selecting one of the cues with a hand gesture.

FIG. 1 is a top-down perspective diagram illustrating a set of auditory cues 18*a-f* presented spatially around a user 12 by a portable electronic device 14. In the example shown, the spatial audio cues are heard by the user 12 through a headset 16. Through the headset 16, the user 12 perceives the audio cues 18*a-f* as being located in space about the user 12 as shown. The device 14 is configured to sense user movement relative to the device 14, made in response to the audio cues 18*a-f*. By detecting the user movement and matching the detected movement to one or more of the presented audio cues, the device 14 can determine which audio cue is being selected based on the user gesture. Thus, the device 14 permits the user 12 to select an audio cue with a user motion, for example, a hand gesture.

The portable device 14 may be a handheld device configured, through software programming and/or hardware design, to perform the functions described herein, such as a wireless communication device, for example, a smart phone, a cellular phone, personal digital assistant (PDA) or the like. The device 14 may also be an MP3 player, gaming device, laptop or notepad computer, personal stereo, stereo system or the like. The device 14 may alternatively be a non-portable device in some arrangements.

Figure 2:
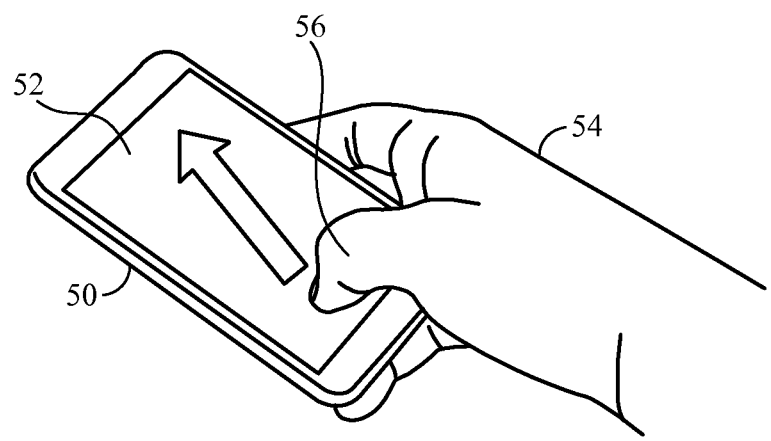
FIG. 2 illustrates an exemplary portable electronic device configured to select auditory cues by detecting user swipes across a touch screen.

FIG. 2 illustrates an exemplary portable electronic device 50 that may be used as the device 14 of FIG. 1. The electronic device 50 is configured to select auditory cues by detecting user swipes across a touch screen 52 included in the device 50. The user holds the device 50 in his/her hand 54, and can swipe a digit, e.g., a thumb 56, across the touch screen 52 in the perceived direction of an audio cue. The device 52 determines the direction of the swipe and matches the swipe direction to one or more of the presented audio cues, thereby determining which audio cue the user is selecting.

The device 50 may also include a gravity sensor and/or compass for obtaining the absolute direction of the swipe across the touch screen, irrespective of the orientation of the portable device. The device 50 is useful for in-pocket touch screen gestures.

Figure 3:
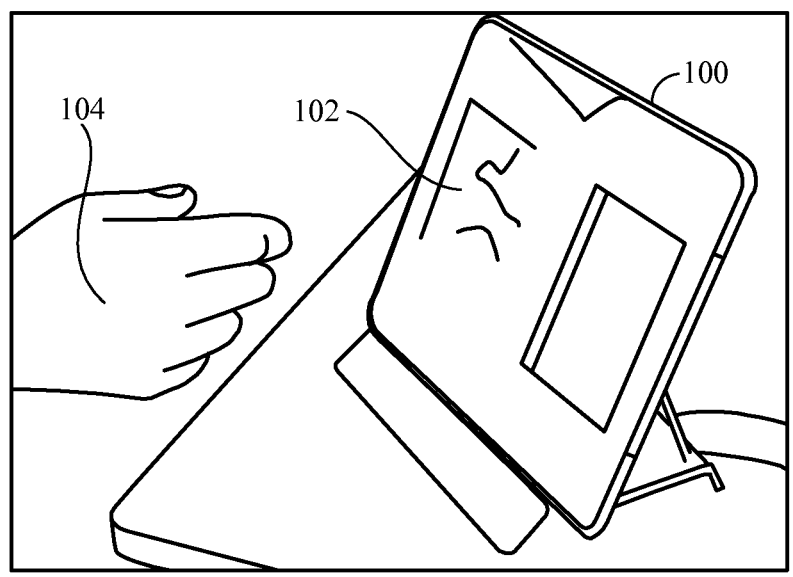
FIG. 3 illustrates an exemplary electronic device configured to select auditory cues by detecting user movement near the device.

The device 14 of FIG. 1 can alternatively/additionally determine user-selected audio cues by recognizing user gestures with near-field sensors, such as ultrasonic transducers, included in the portable device. Such a device is shown in FIG. 3, which illustrates an exemplary electronic device 100 configured to determine user-selected auditory cues by detecting user movement near the device 100. The device 100 may be used as the device 14 of FIG. 1. The device includes a display screen 102 and a plurality of near-field motion sensors, such as ultrasonic transceivers (not shown). The motion sensors detect user movement relative to the device 100, for example, a hand 104 motion in the direction of the selected audio cue. From sensor data, the device 100 determines the direction of the user movement and matches the direction to one or more of the presented audio cues, thereby determining which audio cue the user is selecting.

Figure 4:
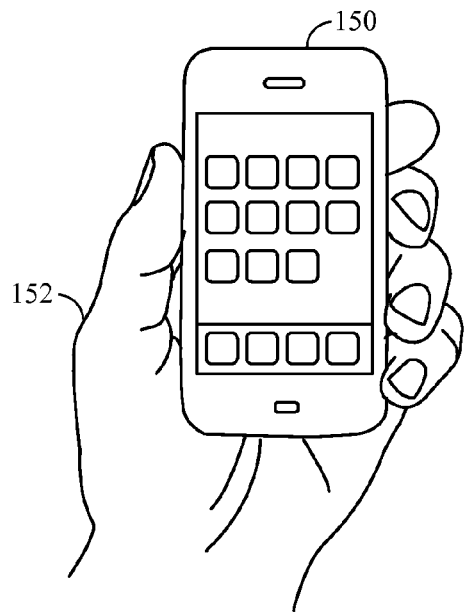
FIG. 4 illustrates an exemplary portable electronic device configured to select auditory cues by detecting a user grip on the device.

The device 14 of FIG. 1 can alternatively/additionally determine user-selected audio cues by recognizing user gestures with close-range touch sensors built into a portable device. Such a device is shown in FIG. 4, which illustrates an exemplary portable electronic device 150 configured to select auditory cues by detecting a user grip on the device 150. The device 150 may be used as the device 14 of FIG. 1. The device includes a plurality of sensors, such as inductive sensors (not shown) mounted to the body of the device. The sensors detect user touches on the device 150. For example, a user can grasp the device 150 in his/her hand 152 and place digits at certain locations on the periphery of the device 150. From the sensed touch/grasp, the device 150 determines the direction of the selected audio cue. The device 150 then matches the direction to one or more of the presented audio cues, thereby determining which audio cue the user is selecting.

The device 14 of FIG. 1 can alternatively/additionally determine user-selected audio cues by triangulation of ultrasonic, infrared, audio or similar signals between an external speaker array and sensors located on a portable device so that the orientation of the portable device can be determined. Thus, using this approach, the user can point in the perceived direction of a spatial audio cue with the portable device, and the pointing orientation can be detected so that the selected audio cue can be identified by the system.

Figure 5:
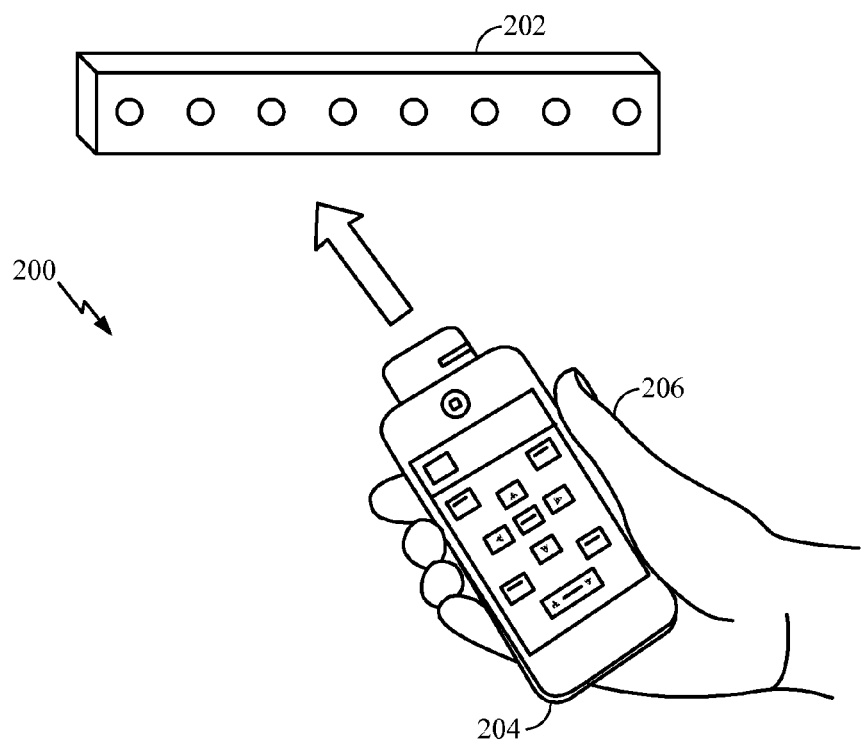
FIG. 5 illustrates an exemplary system employing a portable device in proximity to a stationary device for detecting user selection of auditory cues generated by the system.

Such a system is shown in FIG. 5, which illustrates an exemplary system 200 employing a portable device 204 in proximity to a stationary device 202. The system 200 is configured to generate spatial audio cues and then detect user selection of certain of the auditory cues. In the example shown, the stationary device 202 includes an array of speakers that emit an ultrasonic signal. The portable device 204 includes a plurality of microphones (not shown) that produce microphone signals in response to the ultrasonic signal. The system 200 includes a processor configured to detect user movement relative to either device 202, 204 based on the microphone signals. Thus, a user can grasp the portable device 204 in his/her hand 206 and by moving his/her hand, select one or more of the spatial audio cues.

Figure 6:
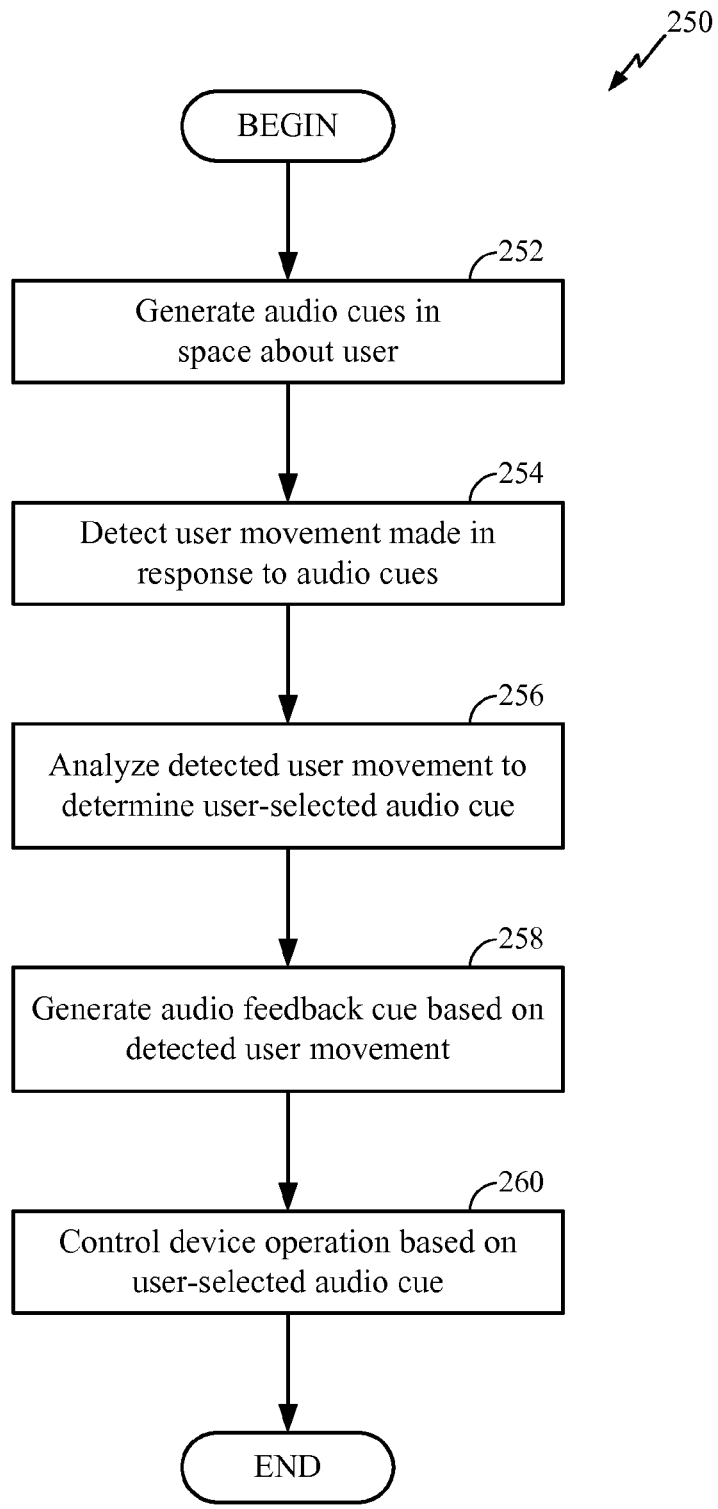
FIG. 6 shows a flowchart of an exemplary method of controlling a device based on user-selected audio cues.

FIG. 6 shows a flowchart 250 of an exemplary method of controlling a device, such as any of the devices 14, 50, 100, 150 or system 200 shown in FIGS. 1-5, based on user-selected audio cues. In box 252, the electronic device generates audio cues that are audibly perceivable in a space about a user. Each of the audio cues is generated so as to be perceived by the user as a directional sound at a distinct location from other audio cues in the space.

As further described in connection with the method depicted in FIG. 7, an audio cue rendering engine 654 (FIG. 10) generates audio output signals based on the spatial auditory cue location and sound type information produced by a spatial audio cue (SAC) generator. The audio rendering engine 654 implements the spatial movement and localization of the spatial audio cues output by applying one or more head-related transfer function (HRTF) filters to input audio signals and processing them. As is known, a pair of HRTFs for two ears can be used to synthesize a binaural sound that seems to come from a particular point in space. For example, a continuous movement of sound can be implemented by filtering sounds with HRTF filters and quickly interpolating different HRTF coefficients as time passes. The location information provided for the spatial audio cue generator may be applied to the HRTF filters to create the perception of the audio cues moving or emanating from a particular location. Thus, the spatial audio cues from the SAC generator may be rendered so that a listener perceives the audio output representing the spatial audio cues as moving through the space around the listener.

In box 254, the electronic device detects user movement relative to the electronic device, made in response to the spatial audio cues. After hearing the choices laid out by the spatial audio cues, the user can make selections in different ways. Any of the following methods or a combination thereof may be used to detect user movement in making an audio cue selection.

1. In-pocket touch screen gestures: This method uses a touch screen, for example, as shown in FIG. 2. This method is referred to as "in-pocket" because the user does not need to see the touch screen, and thus, it can be done "in-pocket," i.e., out of sight of the user. With in-pocket selection, one or more fingers touch and swipe the device's touch screen so that a direction in space is indicated. The swiping direction indicates that the menu item (spatial audio cue) along the direction of the swipe is selected. The menu item is presented as a spatial audio cue perceivable by the user as a distinct directional sound in space. So upon hearing the cue, the user can swipe toward the cue's perceived location to select it. The swiping direction can be made more accurate by coordinating sensors such as a gravity sensor and compass included in the device. With these sensors correcting the swiping action, an absolute direction of swipe can be obtained, regardless of the orientation of a handheld device.

2. Ultrasound gestures: with ultrasound transducers (both transmitters and receivers) on a device, gestures can be recognized without the user touching the device. An example of this method is illustrated in FIG. 3. A hand gesture going from one point to another in proximity of the device can be detected by the ultrasonic sensors and indicate a motion vector in space giving the direction of the user's hand gesture. The orientation of the vector can point to the desired spatial audio cue selection, and trigger a selection event to further control operation of the device.

3. Close-range touch sensing: Close-range sensing techniques may use inductive touch sensors, so that the handheld device can detect which part of the device is being gripped and touched. For example, ultrasonic sensors may be located along the edge of a device, so that wherever the device is being touched is sensed as a strong ultrasonic echo, thus creating a map around the device indicating how it is being touched and grasped. With such touch information, the points and edges being touched can be continuously monitored to detect a user grasp that corresponds to a particular audio cue. In addition the touch/grasp information can get sonified in the audio space, aurally overlaying with menu/content selection information that was presented as spatial audio cues to the user. A further action of single or multi-tap, or finger pressure can indicate a user's "mouse click" selection, for example. An example of a device configured to use this method is illustrated in FIG. 4.

4. Accessory assisted selection: the audio space used to present spatial audio cues can be realized as a spatially filtered headphone signal or a virtual space created in a field with stereo speakers or speaker arrays. With devices such as a small speaker array with built-in ultrasonic transducers, the system can accurately determine location and user interface actions using, for example, ultrasonic triangulation. Multiple-microphones and speakers on the speaker array can be used to detect gestures using algorithms similar to those used for the ultrasonic gestures method, described above. For example, the arrays can be used to detect the location of a pointing object such as a pointing finger or a device. The location information derived from the ultrasonic microphone signals can be used to determine user audio cue selection. An example of a device configured to use this method is illustrated in FIG. 5.

As an example, with this technique a user can point his/her portable device with ultrasonic microphones, and a speaker array device emits ultrasonic signal through its speakers. By triangulation between the speakers and the device's microphones, the orientation of the handheld device can be calculated. In an alternative arrangement, the handheld device may have ultrasonic transmitters and the speaker array may have one or more microphones to listen to the ultrasonic transmissions from the device to accomplish the triangulation determination. The pointing direction of the portable device can be determined in this manner. Matching the detected pointing direction of the device with the locations of the spatial audio cues being presented can be done to determine the user selection of an audio cue.

The speaker array device is either wired to the handheld device or in wireless communication with the device. In this configuration, the user interface processing may be on the array and/or handheld device. The signaling/sensor frequency range is not limited to ultrasonic. For example, in an alternative configuration, audio sound may be used, with multi-microphone technology. However, in this configuration, the user may hear sounds that are intended to be used for localization and direction determination.

In box 256, the device analyzes the detected user movement to determine which audio cue(s) the user selected. The detected movement can be analyzed to determine the direction of the user movement or gesture. The direction of the movement or gesture can be mapped as a vector onto a virtual coordinate grid maintained by the device. The device also maps the location of each presented audio cue onto the coordinate grid. The minimum distance between the line described by the gesture vector and each of the coordinate locations of the audio cues in the virtual coordinate system can be computed. The audio cue(s) that are closest to the line, e.g., the one with the smallest minimum distance, are determined as the selected spatial audio cue(s). In this manner, the direction of the user movement can be matched to one or more of the presented audio cues, whereby indicating the selected audio cue(s). An absolute gesture direction can be determined by using data from coordinating sensors such as a gravity sensor and compass included in the device. With data from these sensors giving the orientation of the device during the gesture, an absolute direction of the user gesture can be obtained by translating the coordinates of the gesture vector using these data. In this manner, the absolute direction of the gesture can be determined, regardless of the orientation of a handheld device.

In box 258, a spatial audio feedback cue is generated by the device, based on detected user movement. The spatial audio feedback cue is generated so that it can be audibly perceived in the space about the user so as to correspond to the detected direction of the user movement. As further described in connection with the method depicted by FIG. 8, an audio feedback cue rendering engine 660 (FIG. 10) generates audio output signals based on the spatial auditory feedback cue location and sound type information produced by a feedback spatial audio cue (FSAC) generator. The audio feedback cue rendering engine 660 implements the spatial movement and localization of the audio feedback output by applying one or more HRTF filters to input audio signals and processing them. For example, a continuous movement of sound can be implemented by filtering sounds with HRTF filters and quickly interpolating different HRTF coefficients as time passes. The location information provided for the spatial feedback audio cues may be applied to the HRTF filters to create the perception of the audio feedback cue moving or emanating from a particular location. Thus, the spatial feedback audio cues from the FSAC generator may be rendered so that a listener perceives the feedback audio output as moving through the space around the listener.

In box 260, operation of the device may be affected and/or controlled by the spatial audio cue selected by the user. For example, in response to the selected audio cue, the device may select a certain song for playback, shut down, increase its volume, play a certain video, or the like. To accomplish this, one or more control signals are generated by the device based on the spatial audio cue that is determined to be selected by the user, which is based on the detected user gesture made in response to the presented spatial audio cues.

Figure 7:
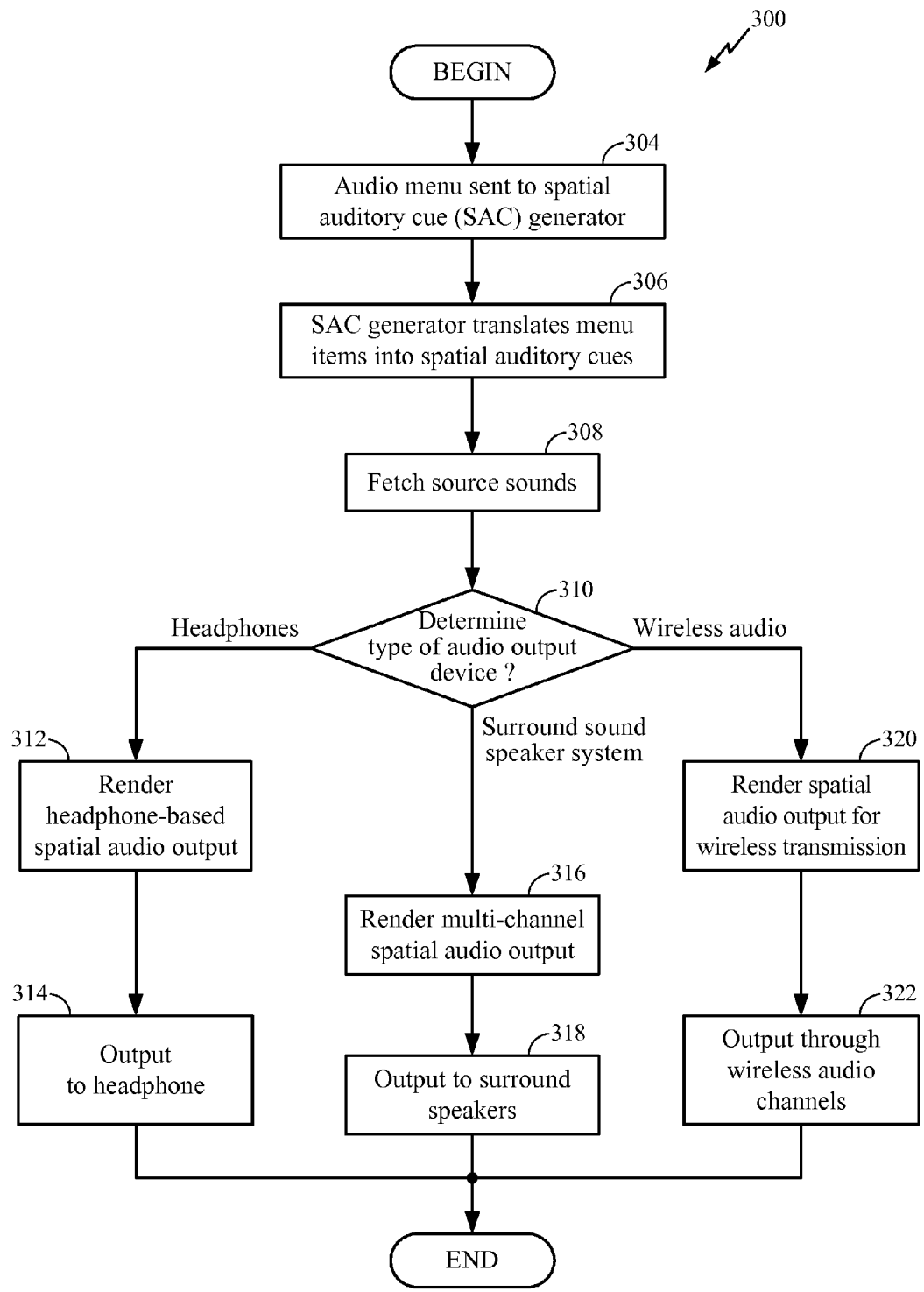
FIG. 7 shows a flowchart of an exemplary method of producing spatial audio cues.

FIG. 7 shows a flowchart 300 of an exemplary method of producing spatial audio cues. In block 304, an audio menu indicating spatial audio cues is sent from an application to a spatial audio cue (SAC) generator. The menu identifies the audio cues and the location and sound type associated with each spatial audio cue. The location can be a 2D or 3D coordinate location in a virtual coordinate grid maintained by the system. The SAC generator can be implemented in software as part of an audio cue rendering engine 654, as shown in FIG. 10.

In block 306, the SAC generator translates the audio menu into spatial auditory cues. Each spatial auditory cue corresponds to a particular location within the listener space. The spatial auditory cue selected for a particular menu item is chosen from a plurality of spatial auditory cues corresponding to a plurality of locations within the listener space. Each of the spatial auditory cues corresponds to a respective, distinct location within the listener space.

Figure 10:
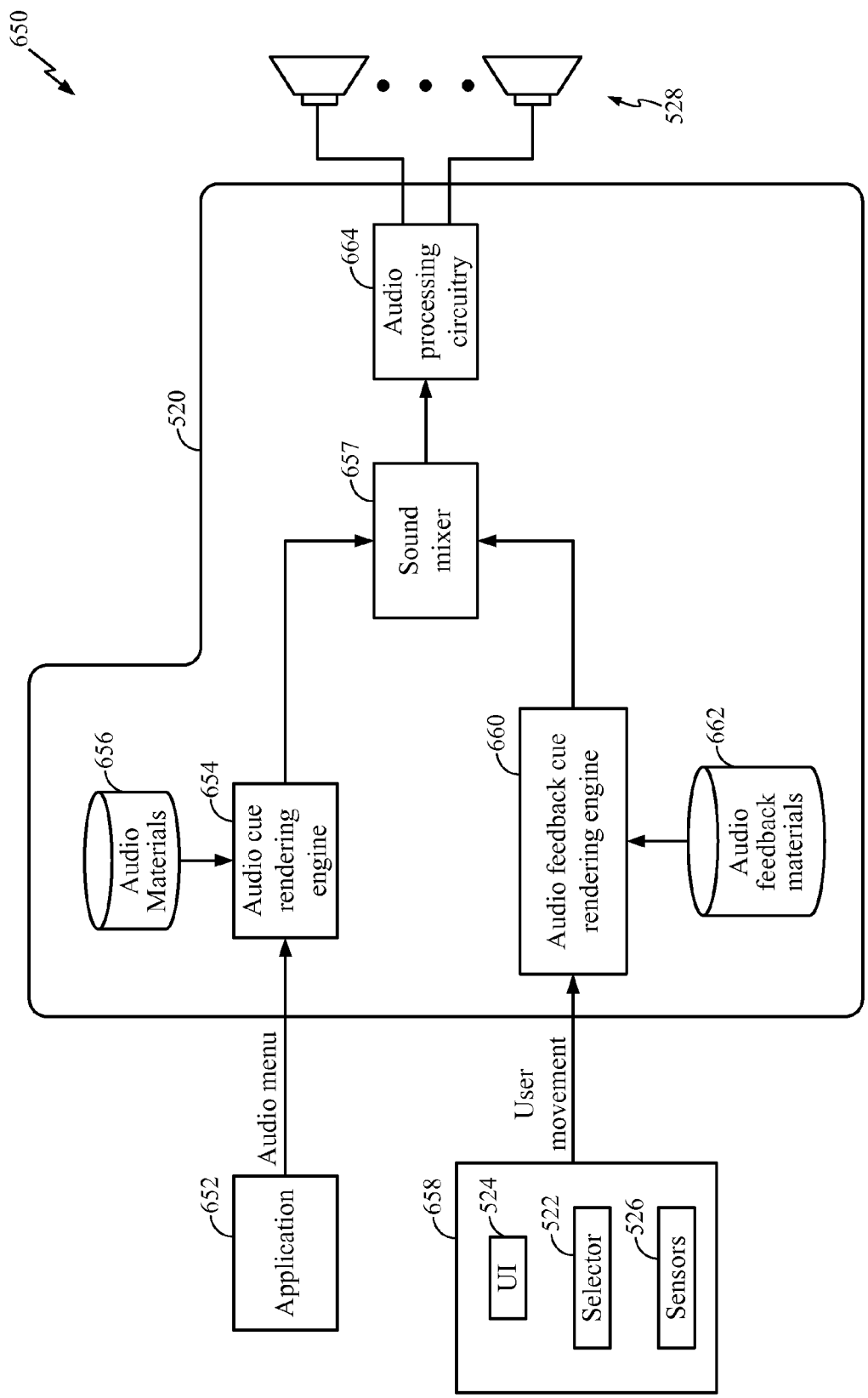
FIG. 10 is a block diagram illustrating certain components of an exemplary apparatus for outputting spatial audio cues, detecting user-selected spatial audio cues and outputting spatial audio feedback cues.

In block 308, an audio rendering engine, e.g., the audio cue rendering engine 654 of FIG. 10, fetches one or more sound sources corresponding to the spatial auditory cues from an audio materials database 656. Each sound source may be an audio file storing a snippet of digitized audio. The stored sound sources may be stored in the database 656 of audio excerpts, recorded sounds, synthesized sounds or the like that are provided as input audio signals to the audio cue rendering engine 654 (FIG. 10). The sound sources may be stored in different audio formats, such as MIDI, MP3, AAC, WAV files or the like. The audio cue rendering engine 654 can convert the sound sources into appropriate formats that can be played by the audio output components. The format of the sound sources may be uncompressed pulse code modulated (PCM) data before they are processed by the audio cue rendering engine 654. Sound sources that are MIDI, MP3, AAC, WAV or other formats can be decoded into PCM data by the audio cue rendering engine 654. The PCM data are filtered by the audio cue rendering engine 654 using, for example, HRTF filters. The specific location at which the output sound sources are perceived by a listener is determined by design of the spatial audio cue information as applied to the HRTF filters.

In decision block 310, the audio cue rendering engine 654 determines the type of audio output device for which the spatial audio cues are to be rendered. In the example disclosed herein, the audio output device may be a headset, surround speaker system, or wireless speaker system.

If the audio output device is a headset, the method proceeds to block 312, and the audio cue rendering engine 654 and associated audio processing circuitry 657, 664 (FIG. 10) render the spatial auditory cues as headphone-based spatial audio output signals. The rendering may include digital-to-analog (D/A) conversion of the digital audio, amplification, filtering, spatial filtering, such as HRTF filtering, and any other audio processing necessary to present the spatial audio cues using headphones. In block 314, the spatial audio output signals are output to headphone speakers within a headset.

If the audio output device is a surround sound speaker system, the method proceeds to block 316, and the audio cue rendering engine 654 and associated audio processing circuitry 657, 664 (FIG. 10) render the spatial auditory cues as multi-channel spatial audio output signals. The rendering may include D/A conversion of the digital audio, amplification, filtering, spatial filtering such as HRTF filtering, and any other audio processing necessary to present the spatial audio cues using the surround sound speaker system. In block 318, the spatial audio output signals are output to the surround sound speakers.

If the audio output device is one or more wireless audio speakers, the method proceeds to block 320, and the audio cue rendering engine 654 and associated audio processing circuitry 657, 664 (FIG. 10) render the spatial auditory cues as digitized spatial audio output signals suitable for transmission over one or more wireless channels. The rendering may include amplification, filtering, spatial filtering such as HRTF filtering, and any other audio processing necessary to present the spatial audio cues using the wireless audio channels. In block 322, the digitized spatial audio output signals are output through the wireless channels.

Figure 8:
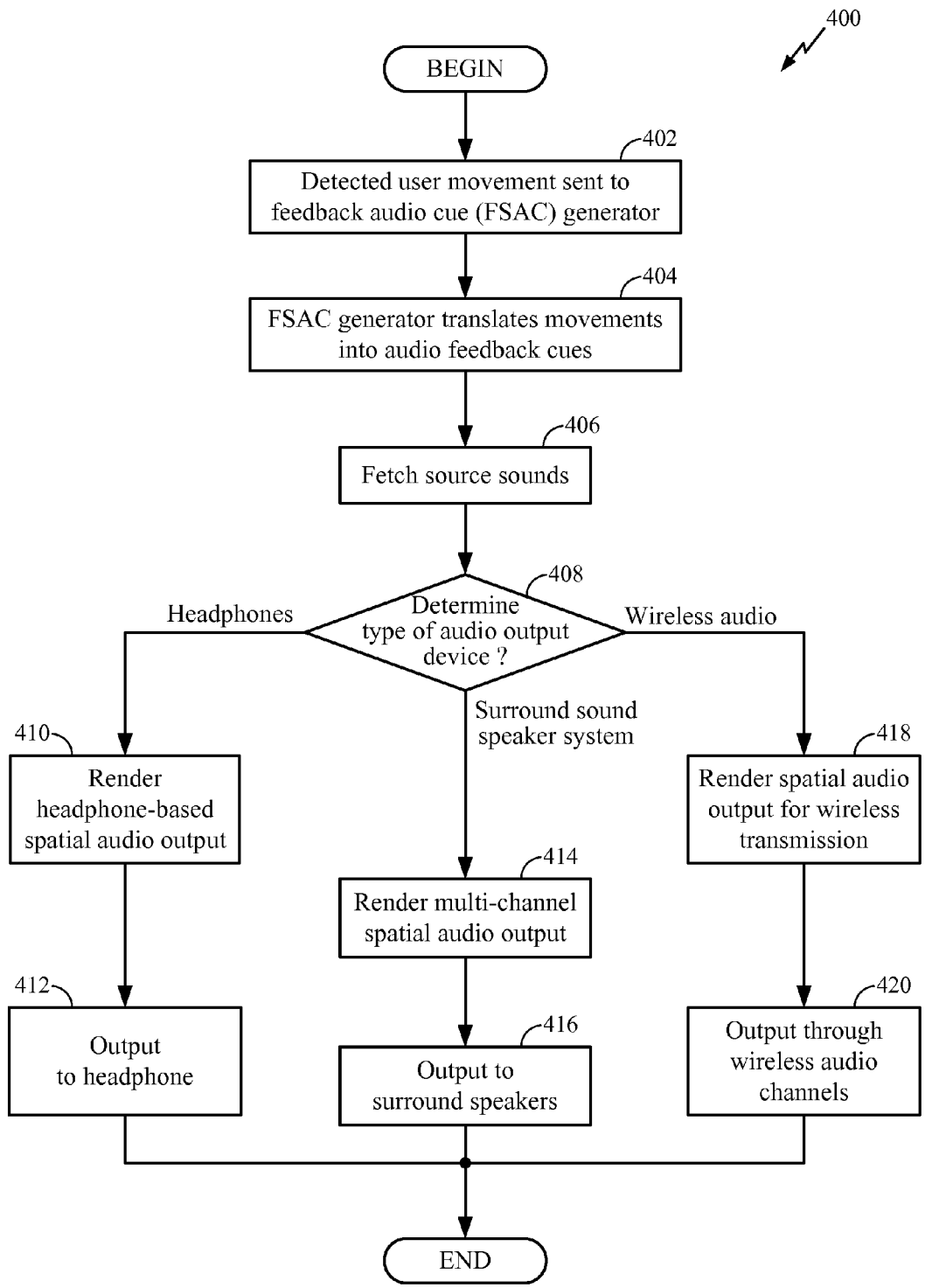
FIG. 8 shows a flowchart of an exemplary method of producing spatial audio feedback cues as a result of detecting a user gesture.

FIG. 8 shows a flowchart 400 of an exemplary method of producing spatial audio feedback cues as a result of detecting a user gesture. In block 402, a signal identifying a detected user movement is sent from the user interface to a feedback spatial audio cue (FSAC) generator. The FSAC generator can be implemented in software as part of the audio feedback cue rendering engine 660 of FIG. 10. The user movement signal identifies a location and direction of the user movement. The location can be a 2D or 3D coordinate location in the virtual coordinate grid maintained by the system, and the direction can include 2D or 3D coordinates identifying a direction or vector in the coordinate grid. The user movement signal is used to select the location, direction and sound type associated with one or more feedback spatial audio cues to be presented by the system.

In block 404, the FSAC generator translates the user movement signal into one or more feedback spatial auditory cues. Each audio feedback cue corresponds to a particular location within the listener space, identified by the user movement signal. The audio feedback cue selected for a particular user motion can correspond to the detected direction of the motion. In some configurations, only a single spatial audio feedback cue is generate as the result of a detected user gesture. In other configurations, multiple spatial audio feedback cues can be generated for a detected user movement. The multiple audio feedback cues can be presented in sequence or simultaneously so that many audio cues are generated to follow user's movement, and these cues can be so dense in location and temporal spacing that they are perceived as a continuous audio event.

In block 406, an audio feedback cue rendering engine, e.g., the audio cue rendering engine 660 of FIG. 10, fetches sound sources corresponding to the audio feedback cue from an audio feedback materials database 662. Each sound source may be an audio file storing a snippet of digitized audio. The particular sound source that is fetched may be determined from the sound type field of indicated by the user movement signal from the user interface. The stored sound sources may be stored in the database 662 of audio excerpts, recorded sounds, synthesized sounds or the like that are provided as input audio signals to the audio feedback cue rendering engine 660. The sound sources may be stored in different audio formats, such as MIDI, MP3, AAC, WAV files or the like. The audio feedback cue rendering engine 660 can convert the sound sources into appropriate formats that can be played by the audio output components. The format of the sound sources may be uncompressed pulse code modulated (PCM) data before they are processed by the audio feedback cue rendering engine 660. Sound sources that are MIDI, MP3, AAC, WAV or other formats can be decoded into PCM data by the audio feedback cue rendering engine 660. The PCM data are filtered by the audio feedback cue rendering engine 660 using, for example, HRTF filters. The specific location at which the output sound sources are perceived by a listener is determined by design of the spatial audio feedback cue information as applied to the HRTF filters.

In decision block 408, the audio feedback cue rendering engine 660 determines the type of audio output device for which the audio feedback cues are to be rendered. In the example disclosed herein, the audio output device may be a headset, surround speaker system, or wireless speaker system.

If the audio output device is a headset, the method proceeds to block 410, and the audio feedback cue rendering engine 660 and associated audio processing circuitry 657, 664 (FIG. 10) render the spatial auditory feedback cues as headphone-based spatial audio output signals. The rendering may include D/A conversion of the digital audio, amplification, filtering, spatial filtering, such as HRTF filtering, and any other audio processing necessary to present the feedback audio cues using the headset. In block 412, the spatial audio feedback output signals are output to headphone speakers within a headset.

If the audio output device is a surround sound speaker system, the method proceeds to block 414, and the audio feedback cue rendering engine 660 and associated audio processing circuitry 657, 664 (FIG. 10) render the spatial auditory feedback cues as multi-channel spatial audio output signals. The rendering may include D/A conversion of the digital audio, amplification, filtering, spatial filtering and any other audio processing necessary to present the feedback audio cues using the surround sound speaker system. In block 416, the spatial audio feedback output signals are output to the surround sound speakers.

If the audio output device is one or more wireless audio speakers, the method proceeds to block 418, and the audio feedback cue rendering engine 660 and associated audio processing circuitry 657, 664 (FIG. 10) render the spatial auditory feedback cues as digitized spatial audio output signals suitable for transmission over one or more wireless channels. The rendering may include amplification, filtering, spatial filtering and any other audio processing necessary to present the feedback audio cues using the wireless audio channels. In block 420, the digitized spatial audio feedback output signals are output through the wireless channels.

Figure 9:
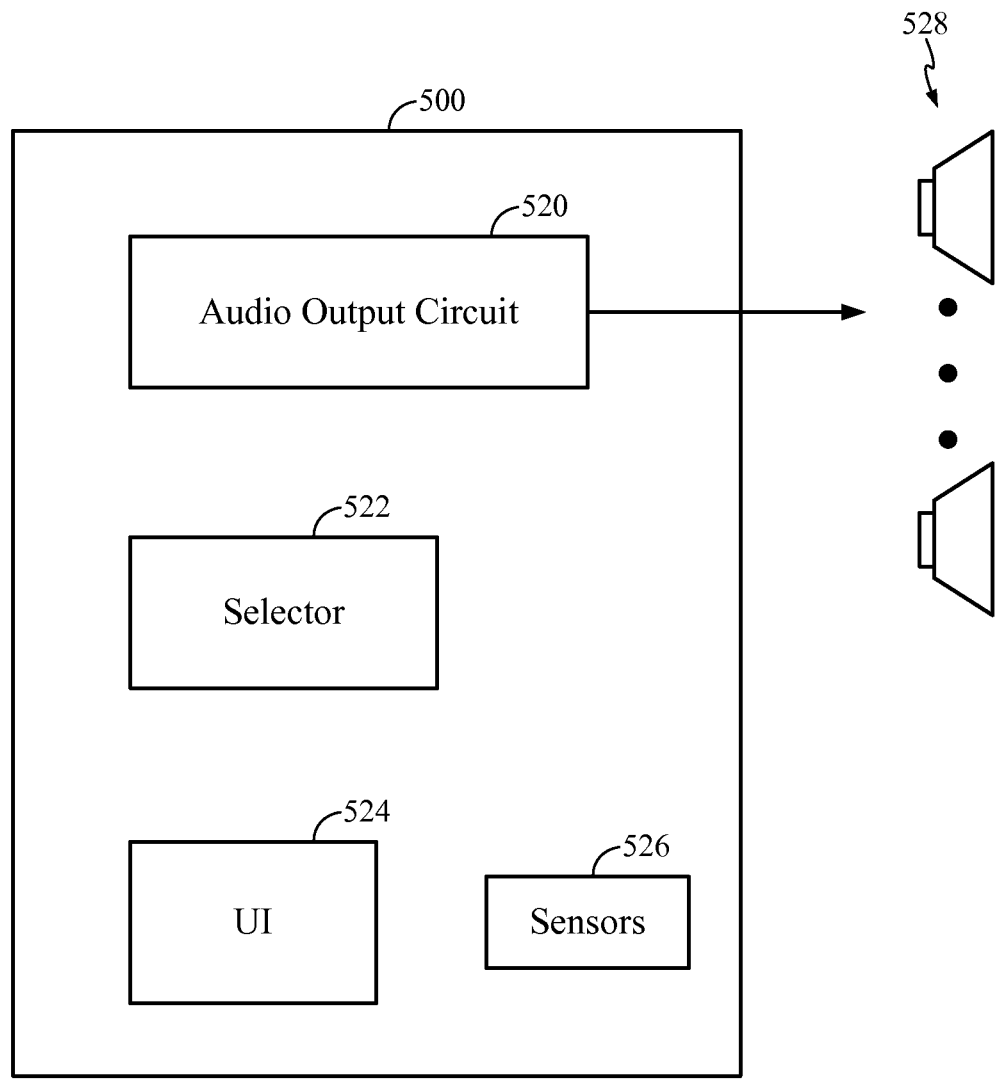
FIG. 9 is a block diagram illustrating certain components of an exemplary apparatus for detecting user-selected spatial audio cues.

FIG. 9 is a block diagram illustrating certain components of an exemplary apparatus 500 for detecting user-selected spatial audio cues. The apparatus 500 can be included in any of the devices 14, 50, 100, 150 or system 200 shown in FIGS. 1-5. The apparatus 500 includes an audio output circuit 520, a user interface (UI) 524, a selector 522 and sensors 526.

The audio output circuit 520 is configured to generate spatial audio cues that are audibly perceivable in a space about a user. To accomplish this, the audio output circuit 520 outputs an audio signal to speakers 528, which although shown as being external to the device 500, may be included in the audio output circuit 520. The speakers 528 convert the audio signal into the spatial sound of the audio cues. Each audio cue is generated so as to be perceived by the user as a directional sound at a distinct location from other audio cues in the space. The audio output circuit 520 can include hardware or a combination of hardware and software components implementing the functions of box 252 of FIG. 6 and/or the method of FIG. 7 to output audio signals representing the spatial audio cues.

The UI 524 is configured to detect user movement relative to the apparatus 500, made in response to the audio cues. The UI 524 may include a touch screen and/or other sensors, such as those discussed in connection with FIGS. 2-5. To detect user movement, the UI 524 can include hardware or a combination of hardware and software components implementing the functions of boxes 254 of FIG. 6

The selector 522 is configured to select at least one of the audio cues based on the detected user movement. The selector 522 may do this by matching the detected direction of the user movement to one or more of the presented audio cues. The selector 522 analyzes the detected movement from the UI 524 to determine, among other things, the direction of the user movement. To accomplish this, the selector 522 can include hardware or a combination of hardware and software components implementing the functions of box 256 of FIG. 6

The audio output circuit 520 may be further configured to produce one or more spatial audio feedback cues based on the user movement detected by the UI 524. The spatial audio feedback cue(s) are audibly perceivable by the user so as to correspond to the detected direction of the user movement. To accomplish this, the audio output circuit 520 can include hardware or a combination of hardware and software components implementing the functions of box 258 of FIG. 6 and/or the method of FIG. 8 to output audio signals representing the spatial audio feedback cues.

The sensors 526 include one or more sensors for detecting the orientation of the apparatus 500. The sensors 526 may include, for example, a gravity sensor and/or compass. The sensor output, such as compass and/or gravity sensor output, can be used to determine an absolute direction of a user motion, such as a directional swipe, irrespective of the orientation of the apparatus 500, as discussed in connection with box 256 of FIG. 6.

FIG. 10 is a more detailed block diagram illustrating certain components of an exemplary apparatus 650 for outputting spatial audio cues, detecting user-selected spatial audio cues and outputting spatial audio feedback cues. The apparatus 650 can be included in any of the devices 14, 50, 100, 150 or system 200 shown in FIGS. 1-5. The apparatus 650 includes an application 652, a user gesture detector 658, the audio output circuit 520, and output speakers 528. The audio output circuit 520 includes an audio cue rendering engine 654, an audio materials database 656, a sound mixer 657, an audio feedback cue rending engine 660, a database of audio feedback materials 662, and audio processing circuitry 664.

The application 652 may be a software application running on the apparatus 650 that produces an audio menu. The audio menu identifies one or more spatial audio cues and is sent from the application to the spatial audio cue (SAC) generator, which is included in the audio cue rendering engine 654. The menu identifies the spatial audio cues and the location and sound type associated with each spatial audio cue. The location can be a 2D or 3D coordinate location in a virtual coordinate grid maintained by the system.

The spatial audio cues can be organized in a hierarchical manner and presented in listener space using tag points, as described in related U.S. patent application Ser. No. 12/905,340, which is hereby incorporated by reference.

The functions of the audio cue rending engine 654, audio feedback cue rending engine 660, audio material database 656, and audio feedback materials database 662 are described above in connection with FIG. 7.

The user gesture detector 658 may include the UI 524, selector 522 and sensors 526. The user movement signal is output by the user gesture detector 658 to the FSAC generator included in the audio feedback cue rendering engine 660.

The sound mixer 657 may receive HRTF filtered PCM audio from the audio cue and audio feedback cue rendering engines 654, 660 and mix the signals using digital audio mixing techniques such as signal weighting to apply various gains. In this manner, audio feedback cues can be perceptually overlaid onto a constellation of presented spatial audio cues.

The audio processing circuitry 664 performs any required audio processing on the output of the audio sound mixer 657 to convert the mixer output into one or more audio signals suitable as input to the speakers 528 to generate the desired sounds. The processing may include D/A conversion of the digital audio, amplification, filtering, balancing, stereo channelization and any other audio processing necessary to present the spatial audio cues and feedback cues using the speakers 528.

The speakers 528 may be any suitable sound transducers, including the speakers, headsets, surround speak system and wireless speaker system disclosed herein.

The audio cue rendering engine 654, audio feedback cue rendering engine 660, sound mixer 657, SAC generator, FSAC generator and at least a portion of the user gesture detector 658 and audio processing circuitry 664 may be implemented by one or more processors executing programming code. The processor can be a microprocessor, such as an ARM7, digital signal processor (DSP), one or more application specific integrated circuits (ASICs), field programmable gate arrays (FPGAs), complex programmable logic devices (CPLDs), discrete logic, or any suitable combination thereof.

Figure 11:
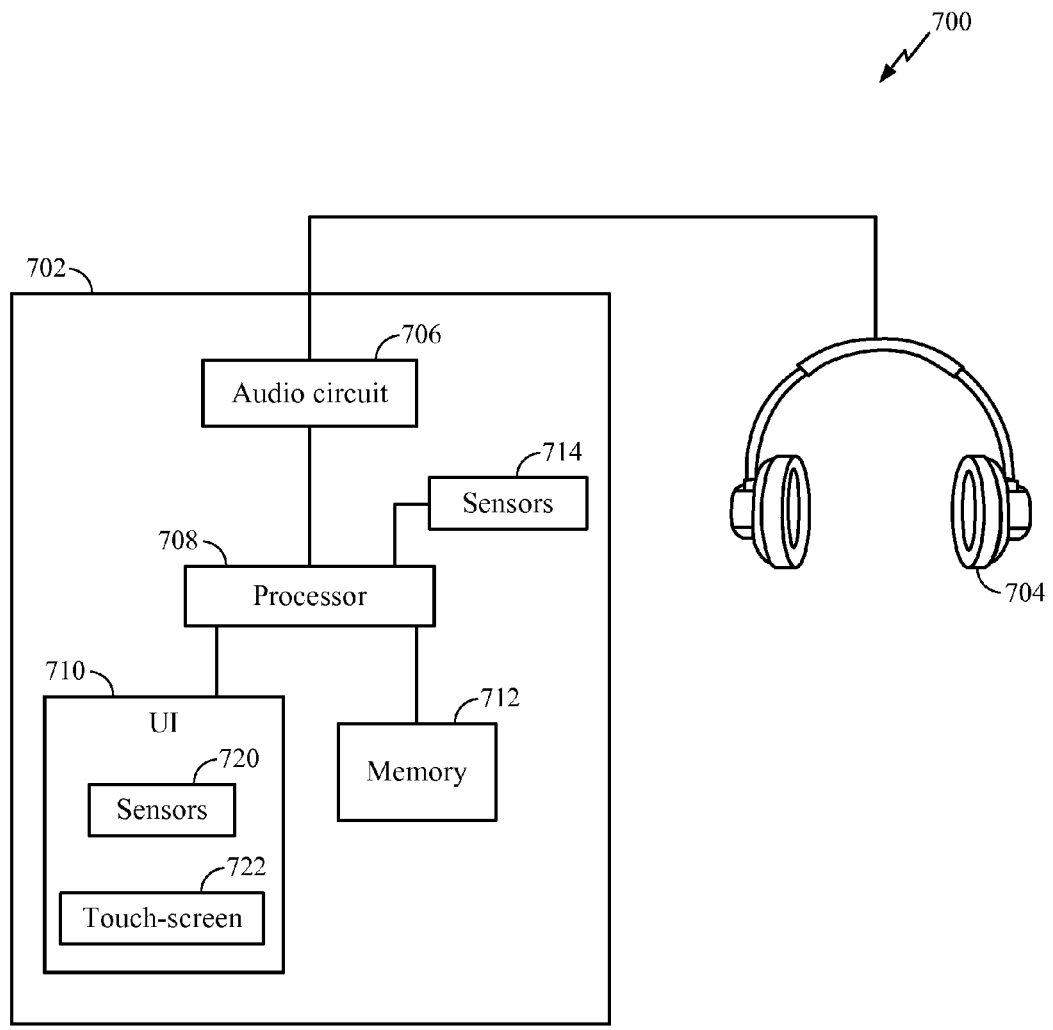
FIG. 11 is a block diagram illustrating certain components of a first exemplary system for outputting spatial audio cues, detecting user-selected spatial audio cues and outputting spatial audio feedback cues, with spatial audio being output through wired headphone.

FIG. 11 is a block diagram illustrating certain components of a first exemplary system 700 for outputting spatial audio cues, detecting user-selected spatial audio cues and outputting spatial audio feedback cues, with spatial audio being output through a wired headphone 704. The system architecture 700 may be configured to implement the functions of any of the devices 14, 50, 100, 150, 204, apparatuses 500, 650 and/or the methods described herein above in connection with FIGS. 1-10.

The system 700 includes an apparatus 702, such as a portable electronic media device, and the headset 704. The apparatus 702 includes an audio circuit 706, a processor 708, a user interface (UI) 710, memory 712 and one or more sensors 714. The UI 710 includes one or more sensors 720 and a touch screen 722.

The memory 712 may store software/firmware and data executable by the processor 708 for implementing the much of functionality disclosed herein in connection with FIGS. 1-10, such as the functions of the application 652 and most of the functions of the audio circuit 520. The UI 710 may include sensors 720, such as the ultrasonic sensors described herein and a touch screen 722 for detecting user gestures made in response to presented spatial audio cues. The sensors 714 may include a gravity sensor and compass, as discussed above herein, for determining the orientation of the apparatus 702.

The processor 708 can be a microprocessor, such as an ARM7, digital signal processor (DSP), one or more application specific integrated circuits (ASICs), field programmable gate arrays (FPGAs), complex programmable logic devices (CPLDs), discrete logic, or any suitable combination thereof.

The audio circuit 706 may include audio hardware and/or software for processing audio so that it is suitable for output to the headset 704. For example the audio circuit 706 may include a multi-channel D/A converter (DAC), and a left-channel amplifier and a right-channel amplifier for driving the headset 704. The amplifiers can be headphone high-impedance (HPH) amplifiers.

Figure 12:
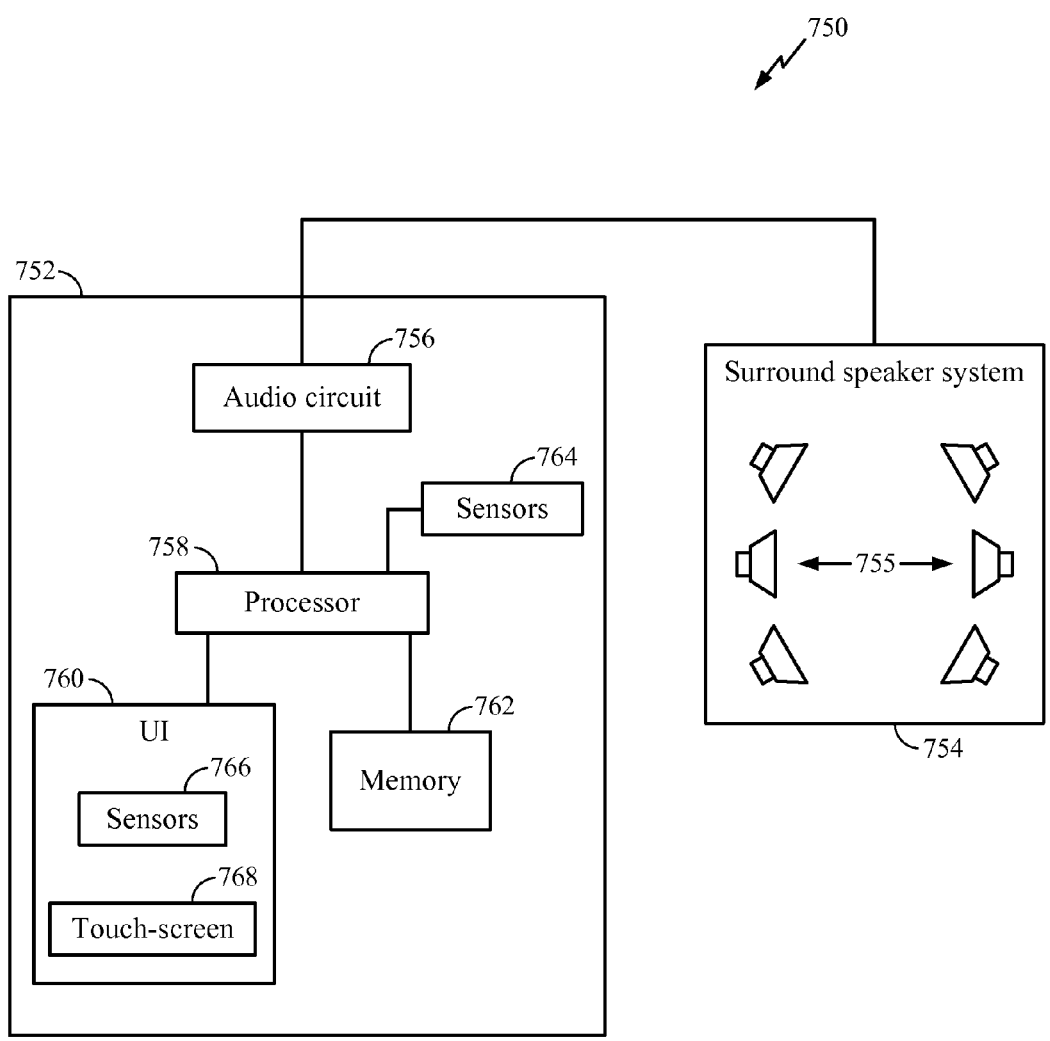
FIG. 12 is a block diagram illustrating certain components of a second exemplary system for outputting spatial audio cues, detecting user-selected spatial audio cues and outputting spatial audio feedback cues, with spatial audio being output through a surround speaker system.

FIG. 12 is a block diagram illustrating certain components of a second exemplary system 750 for outputting spatial audio cues, detecting user-selected spatial audio cues and outputting spatial audio feedback cues, with spatial audio being output through a surround speaker system 754. The system architecture 750 may be configured to implement the functions of any of the devices 14, 50, 100, 150, 204, apparatuses 500, 650 and/or the methods described herein above in connection with FIGS. 1-10.

The system 750 includes an apparatus 752, such as a portable electronic media device, and the surround speaker system 754. The apparatus 752 includes an audio circuit 756, a processor 758, a user interface (UI) 760, a memory 762 and one or more sensors 764. The UI 760 includes one or more sensors 766 and a touch screen 768.

The memory 762 may store software/firmware and data executable by the processor 758 for implementing the much of functionality disclosed herein in connection with FIGS. 1-10, such as the functions of the application 652 and most of the functions of the audio circuit 520. The UI 760 may include sensors 766, such as the ultrasonic sensors described herein and a touch screen 768 for detecting user gestures made in response to presented spatial audio cues. The sensors 764 may include a gravity sensor and compass, as discussed above herein, for determining the orientation of the apparatus 752.

The processor 758 can be a microprocessor, such as an ARM7, digital signal processor (DSP), one or more application specific integrated circuits (ASICs), field programmable gate arrays (FPGAs), complex programmable logic devices (CPLDs), discrete logic, or any suitable combination thereof.

The audio circuit 756 may include audio hardware and/or software for processing audio so that it is suitable for output to the surround speaker system 754. For example the audio circuit 756 may include a multi-channel D/A converter (DAC), filters and channel amplifiers.

The surround speaker system 206 provides multiple speakers 755 that physically surround a listener. The speakers 755 are any suitable audio transducers for converting the electronic signals output from the amplifiers, respectively, into sound.

Figure 13:
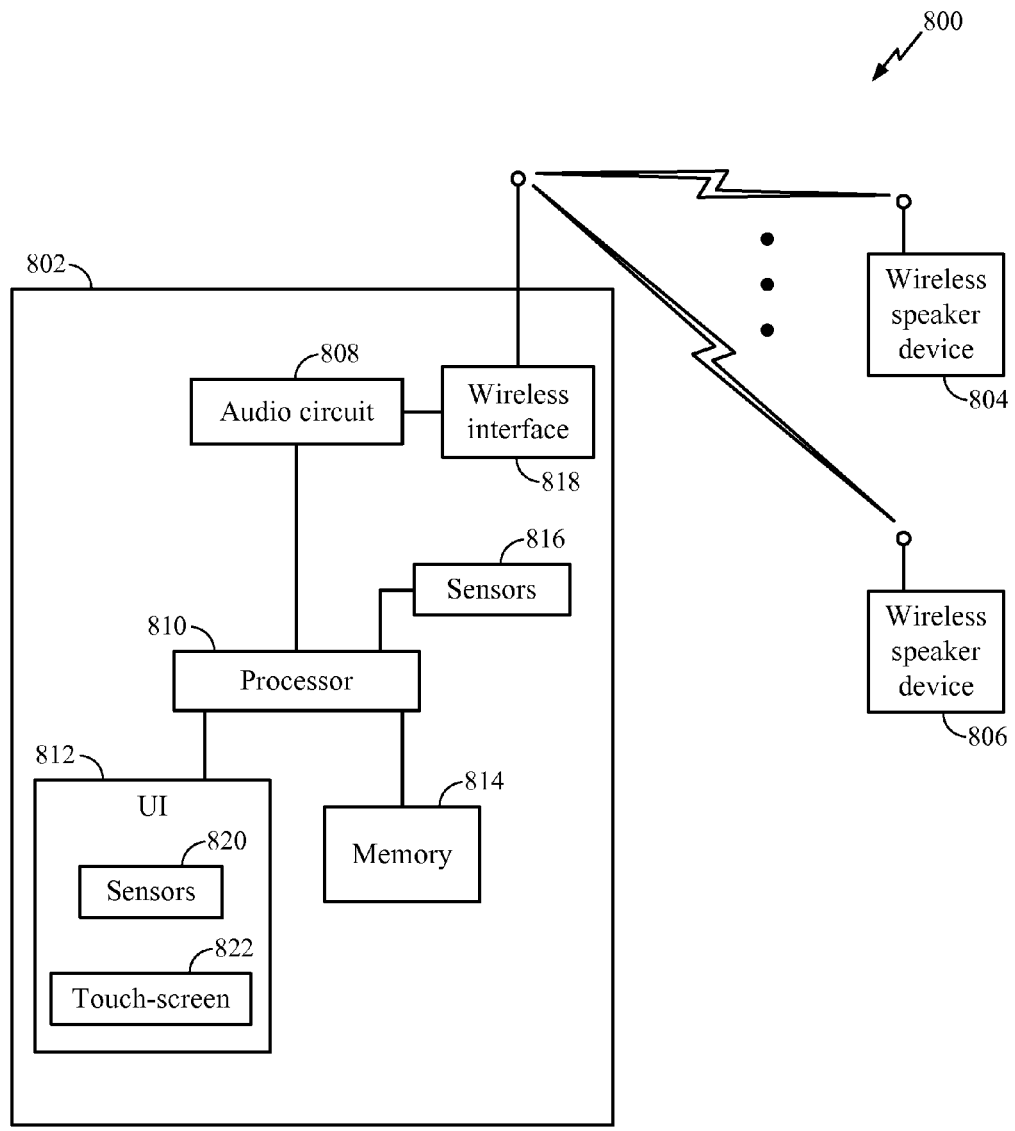
FIG. 13 is a block diagram illustrating certain components of a third exemplary system for outputting spatial audio cues, detecting user-selected spatial audio cues and outputting spatial audio feedback cues, with spatial audio being output through one or more wireless speaker devices.

FIG. 13 is a block diagram illustrating certain components of a third exemplary system 800 for outputting spatial audio cues, detecting user-selected spatial audio cues and outputting spatial audio feedback cues, with spatial audio being output through one or more wireless speaker devices 804, 806. The system architecture 800 may be configured to implement the functions of any of the devices 14, 50, 100, 150, 204, apparatuses 500, 650 and/or the methods described herein above in connection with FIGS. 1-10.

The system 800 includes an apparatus 802, such as a portable electronic media device, and the wireless speaker devices 804, 806. The apparatus 802 includes an audio circuit 808, a processor 810, a user interface (UI) 812, a memory 814, one or more sensors 816 and a wireless interface 818. The UI 812 includes one or more sensors 820 and a touch screen 822.

The memory 814 may store software/firmware and data executable by the processor 810 for implementing the much of functionality disclosed herein in connection with FIGS. 1-10, such as the functions of the application 652 and most of the functions of the audio circuit 520. The UI 812 may include sensors 820, such as the ultrasonic sensors described herein and a touch screen 822 for detecting user gestures made in response to presented spatial audio cues. The sensors 816 may include a gravity sensor and compass, as discussed above herein, for determining the orientation of the apparatus 802.

The processor 810 can be a microprocessor, such as an ARM7, digital signal processor (DSP), one or more application specific integrated circuits (ASICs), field programmable gate arrays (FPGAs), complex programmable logic devices (CPLDs), discrete logic, or any suitable combination thereof.

The audio circuit 808 may include audio hardware and/or software for processing audio so that it is suitable for wireless transmission by the wireless interface 818. The wireless interface 818 includes a transceiver and provides wireless communications with the wireless speaker devices 804, 806. Although any suitable wireless technology can be employed with the apparatus 802, the wireless interface 818 may include a commercially-available Bluetooth module that provides at least a Bluetooth core system including an antenna, a Bluetooth RF transceiver, baseband processor, protocol stack, as well as hardware and software interfaces for connecting the module to the audio circuit 808, processor 810 and other components, if required, of the apparatus 802.

The audio signals can be transmitted over wireless channels to the speaker devices 804, 806 as PCM audio using, for example, protocols as defined by the Bluetooth Specification available at www.bluetooth.com. The Bluetooth Specification provides specific guidelines for transmitting audio signal. In particular, the Bluetooth Specification provides the Advanced Audio Distribution Profile (A2DP) that defines protocols and procedures for wirelessly distributing high-quality stereo or mono audio over a Bluetooth network. The A2DP may be used with the system 800.

The wireless speaker devices 804, 806 may be commercially-available Bluetooth speakers. Each speaker device 804, 806 includes a wireless interface (not shown) for receiving the audio signals transmitted from the device's wireless interface 818 and a speaker. The speaker devices 804, 806 also each include D/A converters (DACs), audio amplifiers (not shown) and other audio processing circuitry for converting the PCM audio into analog audio signals for output on the speakers 804, 806. Any suitable number of speaker devices may be used.

The functions and features of apparatuses 702, 752 and 802 shown in FIGS. 11-13, respectively, can be combined into a single device configured to have multiple, and optionally selectable, output interfaces for providing the spatial audio output signals to the headset 704, surround sound speaker system 754, and wireless speaker devices 804, 806, respectively rendered and formatted.

Figure 14:
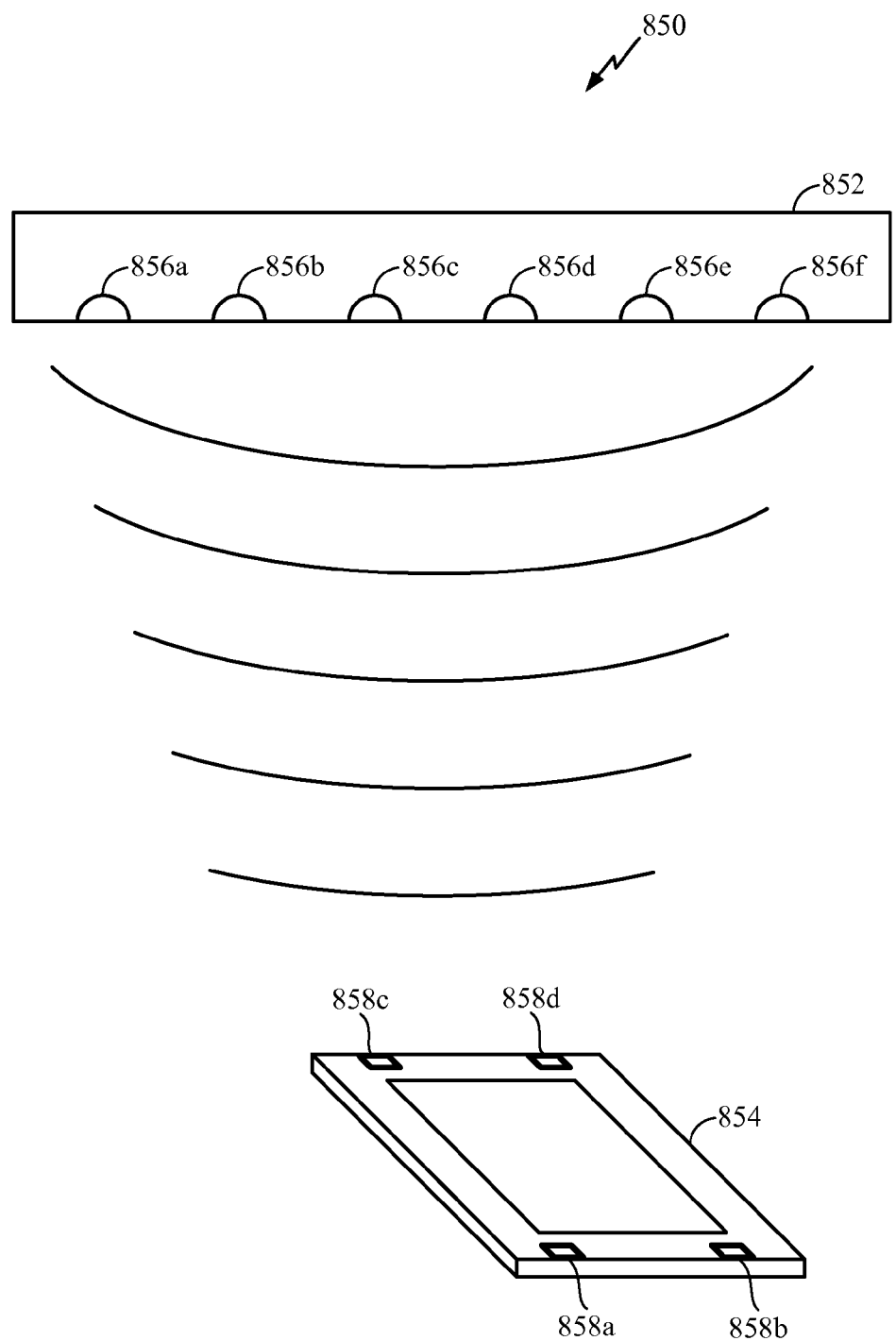
FIG. 14 is a block diagram illustrating certain components of a first exemplary system employing a portable device and a stationary device for detecting user motions made in response to spatial audio cues.

FIG. 14 is a block diagram illustrating certain components of a first exemplary system 850 employing a portable device 854 and a stationary device 852 for detecting user motions made in response to spatial audio cues. The system architecture 850 may be configured to implement the functions of the devices 202, 204, apparatuses 500, 650 and/or the methods described herein above in connection with FIGS. 5-10.

The stationary device 852 includes an array of speakers 856*a-f* configured to emit an ultrasonic signal. The portable device 854 including microphones 858*a-d* for producing microphone signals in response to the ultrasonic signal. The system 850 is configured detect the user movement based on the microphone signals. The system 850 determines the user-selected audio cues by triangulation of the ultrasonic signals between the speaker array 856*a-f* and microphones 858*a-d* on the portable device 854 so that the orientation of the portable device 854 can be determined. If the distance of two anchored point, e.g. two transmitters on the array is known, then the distance from them to the remote device can be measured, respectively, by emitting a signal and measuring echo time, or syncing up with the emission time and computing delay based on the remote device's receiving time. Standard triangulation is used when the absolute time delay from the transmitter to the receiver can be measured. However, in some systems the transmitter and the receiver are independent, and thus, only time offsets among the receivers (on the same device) can be measured. In this case, an additional receiver in the device is required to derive the location of the transmitter. For example, to get a 2D location of the transmitter when the transmit timing is known to the receivers, two receivers are required. When the transmit timing is unknown to the receivers, three receivers are needed.

Thus, using this approach, the user can point in the perceived direction of a spatial audio cue with the portable device, and the pointing orientation can be detected so that the selected audio cue can be identified by the system 850. Signals other than ultrasonic signals may be used with appropriate transducers being substituted for the speaker array 856*a-f* and microphones 858*a-d*, for example, infrared, audio signals or like may be used.

Figure 15:
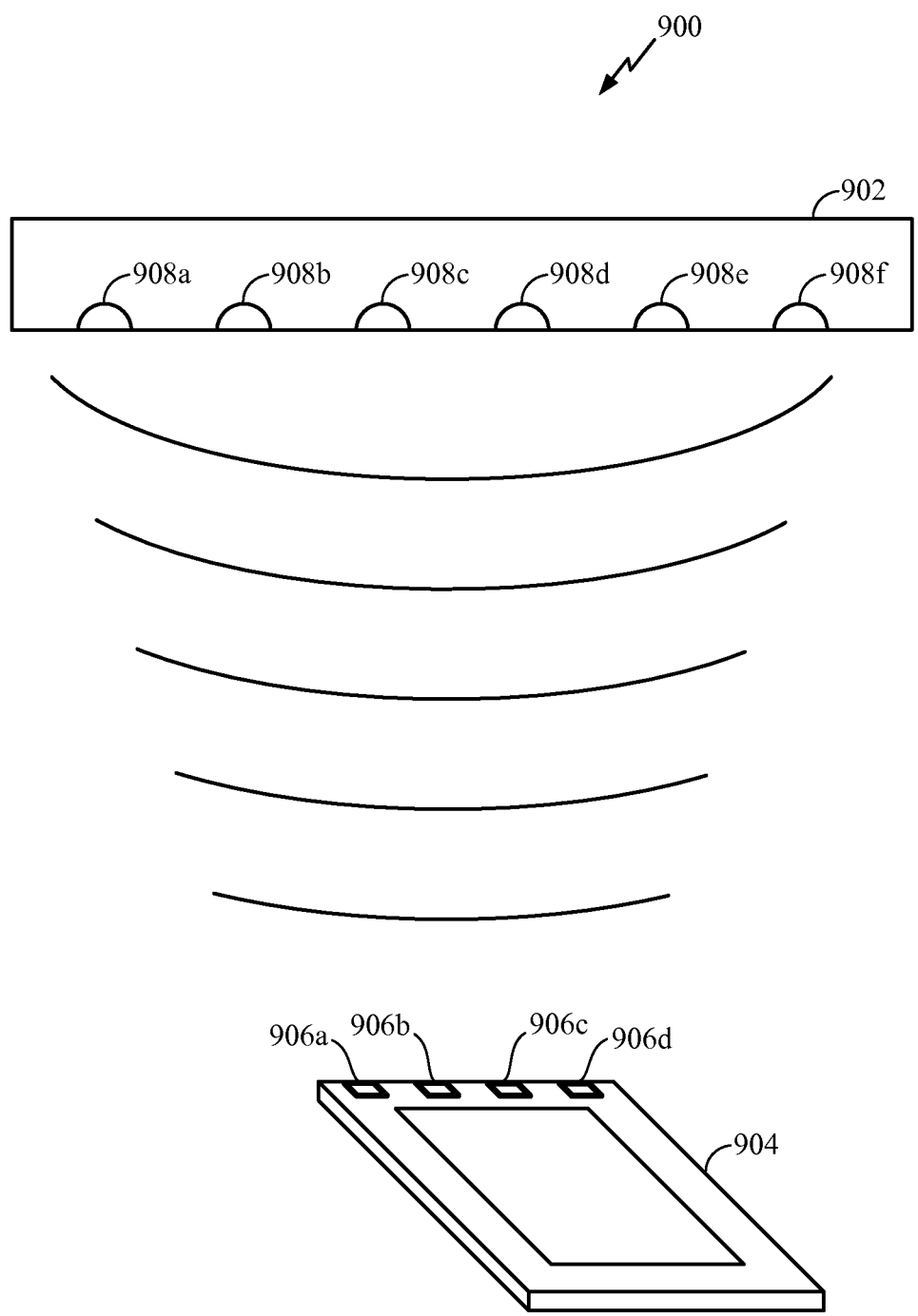
FIG. 15 is a block diagram illustrating certain components of a second exemplary system employing a portable device and a stationary device for detecting user motions made in response to spatial audio cues.

FIG. 15 is a block diagram illustrating certain components of a second exemplary system 900 including a portable device 904 and a stationary device 902 for detecting user motions made in response to spatial audio cues. The system architecture 902 may be configured to implement the functions of the devices 202, 204, apparatuses 500, 650 and/or the methods described herein above in connection with FIGS. 5-10.

In contrast to the system 850 of FIG. 14, the portable device 904 includes an array of speakers 906*a-d* configured to emit an ultrasonic signal and the stationary device 902 includes plural microphone 908*a-f* producing microphone signals in response to the ultrasonic signal. Like the system 850 of FIG. 14, the system 900 is configured detect the user movement based on the microphone signals. The system 900 determines the user-selected audio cues by triangulation of the ultrasonic signals between the speaker array 906*a-d* and microphones 908*a-f* on the stationary device 902 so that the orientation of the portable device 904 can be determined.

In systems 850, 900 the stationary device need only be stationary with respect to the portable device while presenting the spatial audio interface and analyzing user movements in response to the audio cues. At other times, the stationary device need not be stationary.

The systems and apparatuses described herein may include components so that one or more multiple-selection menus or arrays of data selection are audibly presented in 3D audio space instead of visual screens. For example, different genres of music, music categorized by different artists, or contacts in a cell phone can be spatially located "around" the user wearing a headphone running 3D audio algorithm.

The interfacing techniques described herein provide at least the following advantages: users do not have to look at the touch screen in order to enter commands; new ways of interacting with a handheld device that may be convenient and fun; increased safety in some circumstances; and new games.

The functionality of the systems, apparatuses, devices, user interfaces and their respective components, as well as the method steps and modules described herein may be implemented in hardware, digital hardware executing software/firmware, or any suitable combination thereof. The software/firmware may be a program having sets of instructions (e.g., programming code segments) executable by one or more digital circuits, such as microprocessors, DSPs, embedded controllers, or intellectual property (IP) cores. If implemented in software/firmware, the functions may be stored as instructions or code on one or more computer-readable media. The computer-readable media may include computer storage media. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Certain examples of user interfaces, systems, devices, apparatuses, components and methods have been disclosed. The foregoing are examples, and the possible integrations are not limited to what is described herein. Moreover, various modifications to these examples are possible, and the principles presented herein may be applied to other systems as well. For example, the principles disclosed herein may be applied to devices such as personal computers, entertainment counsels, video games and the like. In addition, the various components and/or method steps/blocks may be implemented in arrangements other than those specifically disclosed without departing from the scope of the claims.

Accordingly, other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. An apparatus, comprising:
    at least one close-range touch sensor, on an edge of the apparatus, configured to detect which part of a periphery of the apparatus is being gripped and touched by a user, detect a user grasp of the apparatus that corresponds to a user's selection of a particular audio cue from among a plurality of audio cues that are audibly perceivable in space about the user, and output a detection of the user grasp; and
    a processor configured to generate the plurality of audio cues, each of the audio cues generated so as to be perceived by the user as a directional sound at a distinct location from other audio cues in the space, the processor also being configured to determine user touches at certain locations of the apparatus based on the output of the at least one close-range touch sensor indicating which part of the periphery of the apparatus is being gripped and touched by the user, the processor also being configured to match the output of the at least one close-range touch sensor to one or more of the plurality of audio cues.

2. The apparatus of claim 1, wherein the processor is further configured to match a direction of user movement to one or more of the audio cues.

3. The apparatus of claim 1, wherein the processor is further configured to produce an audio feedback cue based on user movement detected by a user interface, the audio feedback cue being audibly perceivable in the space about the user so as to correspond to a direction of the user movement.

4. The apparatus of claim 1, wherein the apparatus includes a touch screen and the processor is further configured to detect a directional swipe across the touch screen.

5. The apparatus of claim 1, further comprising one or more orientation sensors configured to detect an orientation of the apparatus.

6. The apparatus of claim 5, wherein the processor is further configured to determine an absolute direction of a user directional swipe, irrespective of the orientation of the apparatus, based on output from the one or more orientation sensors.

7. The apparatus of claim 1, wherein the at least one close-range touch sensor is at least one ultrasonic transducer.

8. The apparatus of claim 1, further comprising a plurality of microphones producing microphone signals in response to an ultrasonic signal, wherein the processor is further configured to detect user movement based on the microphone signals, and wherein the processor is also configured to determine an orientation of the apparatus based on the microphone signals.

9. A method, comprising:
    detecting, by at least one close-range touch sensor on an edge of an electronic device, which part of a periphery of the electronic device is being gripped and touched by a user;
    detecting, by the at least one close-range touch sensor, a user grasp of the electronic device that corresponds to a user's selection of a particular audio cue from among a plurality of audio cues that are audibly perceivable in space about the user;
    providing, by the at least one close-range touch sensor, an output of a detection of the user grasp;
    generating the plurality of audio cues, each of the audio cues being generated so as to be perceived by the user as a directional sound at a distinct location from other audio cues in the space;
    determining user touches at certain locations of the electronic device based on the output of the at least one close-range touch sensor indicating which part of the periphery of the electronic device is being gripped and touched by the user; and
    matching the output of the at least one close-range touch sensor to one or more of the plurality of audio cues.

10. The method of claim 9, further comprising matching a direction of user movement to one or more of the audio cues.

11. The method of claim 9, further comprising producing an audio feedback cue based on user movement detected by a user interface, the audio feedback cue being audibly perceivable in the space about the user so as to correspond to a direction of the user movement.

12. The method of claim 9, wherein the electronic device includes a touch screen, and further comprising detecting a directional swipe across the touch screen.

13. The method of claim 9, wherein the electronic device comprises one or more orientation sensors configured to detect an orientation of the electronic device.

14. The method of claim 13, further comprising determining an absolute direction of a user directional swipe, irrespective of the orientation of the electronic device, based on output from the one or more orientation sensors.

15. The method of claim 9, wherein the at least one close-range touch sensor is at least one ultrasonic transducer.

16. The method of claim 9, wherein the electronic device comprises a plurality of microphones producing microphone signals in response to an ultrasonic signal, and further comprising:
    detecting user movement based on the microphone signals; and
    determining an orientation of the electronic device based on the microphone signals.

17. A non-transitory computer-readable medium embodying a set of instructions executable by one or more processors, comprising:
    code for causing at least one close-range touch sensor on an edge of an electronic device to detect which part of a periphery of the electronic device is being gripped and touched by a user;
    code for causing the at least one close-range touch sensor to detect a user grasp of the electronic device that corresponds to a user's selection of a particular audio cue from among a plurality of audio cues that are audibly perceivable in space about the use';
    code for causing the at least one close-range touch sensor to provide an output of a detection of the user grasp;
    code for generating the plurality of audio cues, each of the audio cues being generated so as to be perceived by the user as a directional sound at a distinct location from other audio cues in the space;
    code for determining user touches at certain locations of the electronic device based on the output of the at least one close-range touch sensor indicating which part of the periphery of the electronic device is being gripped and touched by the user; and
    code for matching the output of the at least one-close range touch sensor to one or more of the plurality of audio cues.

18. The non-transitory computer-readable medium of claim 17, further comprising code for matching a direction of user movement to one or more of the audio cues.

19. The non-transitory computer-readable medium of claim 17, further comprising code for producing an audio feedback cue based on user movement detected by a user interface, the audio feedback cue being audibly perceivable in the space about the user so as to correspond to a direction of the user movement.

20. The non-transitory computer-readable medium of claim 17, wherein the electronic device includes a touch screen, and further comprising code for detecting a directional swipe across the touch screen.

21. The non-transitory computer-readable medium of claim 17, wherein the electronic device comprises one or more orientation sensors configured to detect an orientation of the electronic device.

22. The non-transitory computer-readable medium of claim 21, further comprising code for determining an absolute direction of a user directional swipe, irrespective of the orientation of the electronic device, based on the output from the one or more orientation sensors.

23. The non-transitory computer-readable medium of claim 17, wherein the at least one close-range touch sensor is at least one ultrasonic transducer.

24. The non-transitory computer-readable medium of claim 17, wherein the electronic device comprises a plurality of microphones producing microphone signals in response to an ultrasonic signal, and further comprising:
   code for detecting user movement based on the microphone signals; and
   code for determining an orientation of the electronic device based on the microphone signals.

25. An apparatus, comprising:
   means for detecting which part of a periphery of the apparatus is being gripped and touched by a user;
   means for detecting a user grasp of the apparatus that corresponds to a user's selection of a particular audio cue from among a plurality of audio cues that are audibly perceivable in space about the user;
   means for providing an output of a detection of the user grasp;
   means for generating the plurality of audio cues, each of the audio cues being generated so as to be perceived by the user as a directional sound at a distinct location from other audio cues in the space;
   means for determining user touches at certain locations of the apparatus based on the output of the detection of the user grasp indicating which part of the periphery of the apparatus is being gripped and touched by the user; and
   means for matching the output of the detection of the user grasp to one or more of the plurality of audio cues.

26. The apparatus of claim 25, further comprising means for matching a direction of user movement to one or more of the audio cues.

27. The apparatus of claim 25, further comprising means for producing an audio feedback cue based on user movement detected by a user interface, the audio feedback cue being audibly perceivable in the space about the user so as to correspond to a direction of the user movement.

28. The apparatus of claim 25, further comprising means for detecting a directional swipe across a touch screen.

29. The apparatus of claim 25, further comprising means for detecting an orientation of the apparatus.

30. The apparatus of claim 29, further comprising means for determining an absolute direction of a user directional swipe, irrespective of the orientation of the apparatus, based on output from the means for detecting the orientation of the apparatus.

31. The apparatus of claim 25, further comprising:
   means for producing microphone signals in response to an ultrasonic signal;
   means for detecting user movement based on the microphone signals; and
   means for determining an orientation of the apparatus based on the microphone signals.

* * * * *